July 31, 1962  J. C. NILSSON  3,046,665
GAUGE ASSEMBLY
Filed Aug. 24, 1959
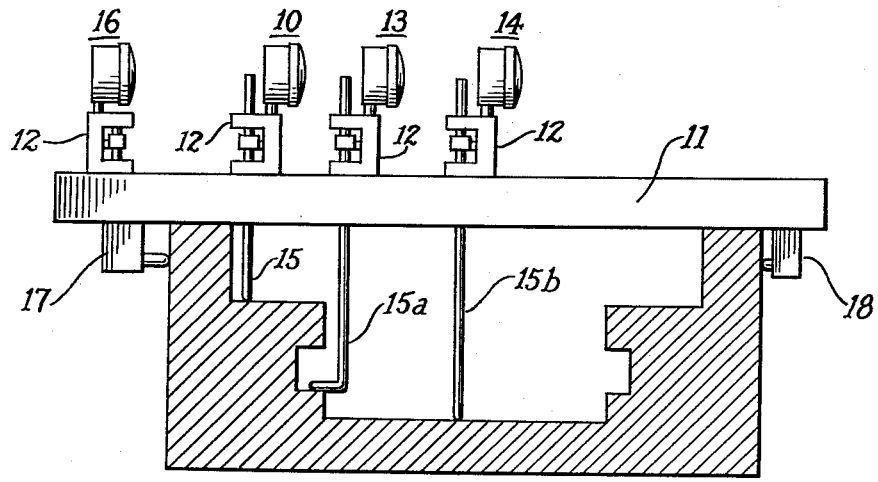
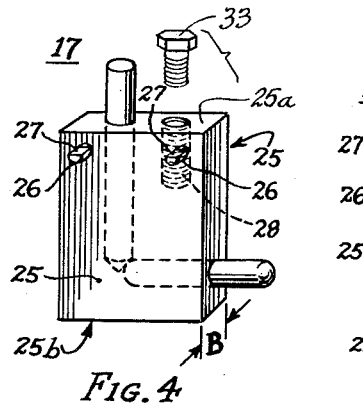
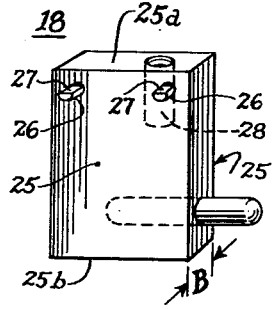
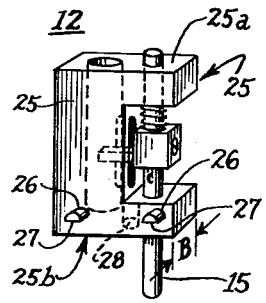
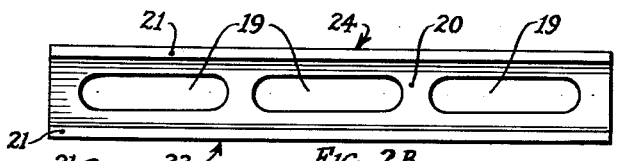
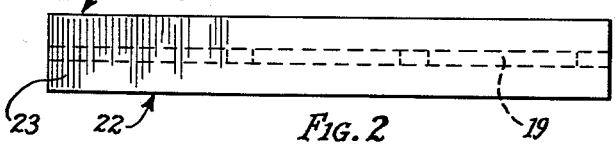
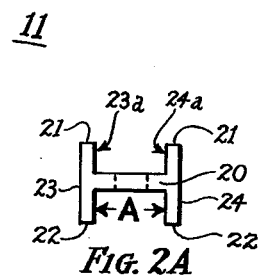
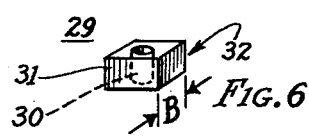
INVENTOR.
John Charles Nilsson
BY
AGENT

United States Patent Office 3,046,665
Patented July 31, 1962

3,046,665
GAUGE ASSEMBLY
John C. Nilsson, 9 Van Duzer Drive, Poughkeepsie, N.Y.
Filed Aug. 24, 1959, Ser. No. 835,534
5 Claims. (Cl. 33—147)

The present invention relates to gauges for the determination of linear measurements, and more particularly to a gauge of this type which is comprised of component parts which are mechanically interconnectable and interchangeable, thus permitting quick and easy assembly thereof for determining a particular desired measurement.

The main disadvantage of linear measurement gauges as heretofore known to the prior art lies in the fact that they have been designed as a permanently assembled unit with the consequence that the use thereof was limited to the particular field of linear measurements for which it was designed. As it is well known, the manufacture of such gauges requires a great expenditure of time and master craftsman techniques and, hence, the gauges themselves are costly items. This first cost becomes an item of extreme importance when the use of the ordinary gauge is necessarily limited to the specific purpose and field for which it was designed.

In the usual linear measurement gauge as presently known and manufactured, the frame or supporting means and the gauging members per se carried thereby comprise a permanently assembled unit which greatly limits the variety of uses which the resulting gauge assembly may have. While it is true that heretofore known gauges have been reworked to adapt them for uses other than those for which the gauge was originally designed, such reconstruction has been complicated and laborious. The cost of such reworking is a further drawback of the known devices.

Although many attempts have been made to overcome the foregoing and other understandable difficulties and disadvantages, none, so far as I am aware, have been entirely successful when carried into operation on a commercial scale.

Accordingly, it is an object of the present invention to provide basic components or units for a linear measurement gauge which may be readily and easily assembled and disassembled thus permitting the erection of a wide variety of gauge types.

Another object of the invention is the provision of basic gauge units, each having a common mechanical interconnection means, whereby the units have a wide variety of manner of assembly.

The invention also contemplates the provision of means for gauging a plurality of linear measurements at one and the same time.

A further object of the invention is the provision of basic gauge units which will have, when assembled, a high degree of accuracy.

A still further object of the invention is to provide a plurality of gauge units which will be simple and relatively inexpensive to manufacture, and rugged and durable in use.

Other objects and advantages of the present invention will become apparent from a consideration of the following specification, taken in conjunction with the accompanying drawings, in which:

FIGURE 1 is an elevational view showing several forms of linear measurement gauge combinations which may be assembled from the basic units according to this invention;

FIGURES 2, 2A and 2B are front, end, and top elevational views, respectively, of the bed or erector bar unit of my gauge assembly components;

FIGURE 3 shows generally a dial indicator (standard A.G.D. type) housing unit adapted for use as one of my gauge assembly components;

FIGURE 4 shows generally a gauging transfer housing unit adapted for use as one of my gauge assembly components;

FIGURE 5 shows generally a range extension unit adapted for use as one of my gauge assembly components; and FIGURE 6 shows a preferred form of a clamp lug unit.

Referring now to the drawings in greater detail, I have shown in FIGURE 1 at 10 a simple gauge assembly comprised of two of the basic units according to this invention. This assembly is made up of an erector bar 11 according to FIGURE 2 and a dial indicator housing unit 12 according to FIGURE 3. The same overall assembly of basic units is shown in FIGURE 1 at 13 and 14, the only difference being in the size and shape of the depth rods 15, 15a and 15b used in conjunction with the indicator housing unit. The selection of a proper depth rod is made by the user of the gauge in accordance with the location or placement of the linear measurement to be determined.

A gauge assembly of units according to this invention adapted to determine an outside dimension of a part is shown at 16 of FIGURE 1. This assembly is made up of an erector bar 11, a dial indicator housing unit 12 arranged at one end of the bar 11, a gauging transfer housing unit 17 according to FIGURE 4 arranged beneath the indicator housing 12 and, at the other end of the erector bar 11 and secured to the underside thereof, a range extension unit 18 according to FIGURE 5. It will be understood, of course, that when each of the units 17 and 18 is turned 180°, the overall gauge assembly becomes one which is adapted to determine an inside dimension of a part.

Accordingly, it may be said that the basic units of the gauge assembly according to my invention are the erector bar 11, the dial indicator housing 12, and the gauging transfer unit 17; and that the depth rod 15 and the range extension unit 18 are supplemental units, the use of each of these latter particular units being determined by the particular linear measurement desired of a machine part.

Referring now to FIGURES 2, 2A and 2B, for a detailed description of the erector bar, the bar 11 is shown as having a generally H configuration in cross-section with a plurality of elongated holes or openings 19 formed in its central web 20.

In the manufacture of the bar 11, if steel stock having an H configuration is not readily available, bar stock having at least two substantially parallel sides 23 and 24 may be used. The central web 20 portion may be milled out with a uniform width between the thus formed inner faces of the sides and to a thickness less than the height of the sides. As a result of the milling operation, the inner faces 23a and 24a of the sides 23 and 24 above and below the web lie in vertical planes which are substantially parallel. A plurality of openings 19 may then be cut through the web 20.

At the upper and lower extremities 21 and 22, respectively, of the sides 23 and 24 of the bar 11, true flat surfaces are ground so that a horizontal plane determined by surfaces 21 is exactly parallel to a similar plane determined by the surfaces 22, and further, that both planes are substantially normal to the planes determined by the inner faces 23a and 24a. The width indicated at A in FIGURE 2A is made sufficient to provide a sliding fit with the dimension indicated at B in FIGURES 3, 4 and 5 on the dial indicator housing unit 12, the gauging transfer housing unit 17 and the range extension housing unit 18, respectively.

As shown in FIGURES 3, 4 and 5, the body of each of the above-mentioned units is shaped generally as a rectangular solid having an upper face 25a, a lower face 25b and two substantially parallel sides 25, the sides being spaced apart a distance indicated by the dimension B noted above so as to have a sliding fit between the inner faces 23a and 24a above and/or below the web 20 of bar 11. Each of the housings has affixed to the sides 25 thereof near either its upper or lower face as the occasion may demand, a support means including a ground flat 27 formed adjacent the face and adapted to contact the ground flat surfaces 21 or 22, respectively, of the erector bar 11 when the housing is inserted between the inner faces 23a and 24a of the bar.

In the embodiment shown, the support means is comprised of a plurality of pins 26 (at least 2 on each side 25) secured to the sides 25 of each housing, with the central longitudinal axis of each of the pins being substantially normal to the vertical planes determined by the sides 25. Each of the housings 12, 17 and 18 also has a vertical bore 28 entering the housing body through either the upper or lower face 25a or 25b thereof as the occasion may demand; that is, the bore 28 enters the housing body through the same face as that to which the support pins 26 are nearest. When the flats 27 are ground on the support means, at a point adjacent the nearest face 25a or 25b, the flats are so ground that they all fall in a single horizontal plane exactly normal to the central longitudinal axis of the vertical bore 28. In order that the housings may be mounted on the bar 11, it will be obvious that the distance between the flats on the pins 26 and the adjacent faces 25a or 25b of the housing must be somewhat less than the distance between the flats 21 or 22 and the adjacent surface of web 20 of the bar 11. The bore 28 preferably is threaded as shown in detail in FIG. 4 and serves as a part of the means for securing a housing body 12, 17 or 18 in fixed relation to the erector bar 11 as will be more fully described hereinafter.

The above described geometric relation between the flats on the pins 26 of each of the respective units and the central longitudinal axis of the bore 28 therein, and the flats at the extremities of the sides 23 and 24 of the erector bar 11 provides a common mechanical contact means whereby the units may be quickly and easily assembled in exact alignment to form gauges having a high degree of accuracy and capable of accommodating many linear measurement problems.

In order to hold constant this geometric relation thus established between the component parts of an assembled gauge according to this invention, I provide a clamp lug 29 (see FIGURE 6) having a bore or passage 30 therethrough and substantially parallel sides 31 and 32. The sides 31 and 32 are spaced apart slightly less than the distance between the inner faces 23a and 24a of the erector bar 11 whereby the lug is adapted to fit therebetween with a sliding fit.

The gauge assembly shown in FIGURE 1 may be assembled by placing an indicator housing 12 between the inner faces 23a and 24a of an erector bar 11 above the web 20 and with the flats 27 of the pins 26 on the housing in contact with the flats at 21 of the erector bar. Next, a clamp lug 29 is placed between the inner faces 23a and 24a of the erector bar 11 below the web 20 thereof. The units may be secured in a fixed relation on the erector bar 11 by a stud or bolt 33 threaded complementary to the threading of the bore 28 in the housing and passing in order through the passage in the clamp lug 29, through an opening 19 in the web of the bar 11 and into the threading of bore 28 of the housing 12.

As it will be readily understood, other arrangements of my units may be assembled in the same manner either on the same erector bar 11 as shown in FIGURE 1, or on separate erector bars 11 as the specific purpose demands. Since the internal gauge actuating mechanisms utilized in my units are well known and their functions well understood, I have not shown details thereof, as the scope of this invention relates only to mechanical construction features whereby the various units may be readily arranged and secured on a bed or erector bar in many forms as the need arises.

While I have illustrated and described a preferred embodiment of this invention, various changes and modifications may be made in the details thereof without departing from the scope of the invention as set forth in the appended claims.

I claim:

1. In a gauge assembly, in combination, an erector bar having two sides and a central portion of uniform width and of less thickness than the height of the sides forming a web interconnecting the inner faces of the said sides, the web having openings therethrough, the upper and lower extremities of the said sides of the erector bar being ground flat surfaces determining, respectively, an upper and lower horizontal plane, the said planes being exactly parallel, a housing assembly having an upper and lower face and two sides, the housing sides being so spaced apart as to have a sliding fit between the inner faces of the sides of the erector bar, the housing being arranged between the said inner faces and on one side of the said web of the erector bar, means affixed on each of the sides of the housing assembly near one face thereof and including a ground flat thereon adjacent the said one housing face, the last-mentioned flats all being in the same horizontal plane, the body of the housing also defining a bore therein beginning from the said one face thereof, the central longitudinal axis of said bore being normal to the plane of the flats carried by said housing assembly, a clamp lug having an axial passage therethrough and arranged between the inner faces of the sides of the erector bar on the other side of the web, and a securing means arranged in order through the passage in the lug, one of the openings in the said web, and into the vertical bore of the said housing, whereby the erector bar, the housing and the lug are held in fixed relation with the flats on the means affixed to the housing in contact with the flat surfaces adjacent thereto on the erector bar.

2. A gauge assembly according to claim 1, in which the erector bar is of H configuration in cross section, the said sides being formed on the outside of the vertical legs of the H, the said web forming the cross bar of the H, the said inner faces being formed on the inside of the vertical legs of the H above and below the web, and the said ground flat surfaces being formed on the upper and lower ends, respectively, of the vertical legs of the H.

3. A gauge assembly according to claim 1, in which the securing means comprises a threaded bolt and the vertical bore in the housing is threaded for complementary engagement with said bolt.

4. A gauge assembly according to claim 1, in which the means affixed on the sides of the housing assembly including ground flats thereon comprises a plurality of pins secured to the sides of the housing assembly, the central longitudinal axis of each pin being in a plane substantially parallel to the said parallel planes determined by the said flat surfaces of the erector bar and substantially normal to the vertical bore within the housing.

5. A gauge assembly according to claim 4, in which the ground flats on the means affixed to the sides of the housing assembly are arranged on the periphery of each of the pins at a point adjacent the said one face of the housing through which the said vertical bore enters the body of the housing.

References Cited in the file of this patent

UNITED STATES PATENTS

| 2,593,986 | Comstock | Apr. 22, 1952 |
| 2,844,877 | Mogolis | July 29, 1958 |
| 2,892,257 | Tandler et al. | June 30, 1959 |